(12) United States Patent
Frick et al.

(10) Patent No.: US 11,560,133 B2
(45) Date of Patent: Jan. 24, 2023

(54) SYSTEMS AND METHODS FOR LIMITING ENGINE TORQUE AND CONTROLLING A CLUTCH

(71) Applicant: GM GLOBAL TECHNOLOGY OPERATIONS LLC, Detroit, MI (US)

(72) Inventors: Stefan M. Frick, West Bloomfield Township, MI (US); Bradford W. Bur, Clarkston, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 190 days.

(21) Appl. No.: 17/036,834

(22) Filed: Sep. 29, 2020

(65) Prior Publication Data

US 2022/0097674 A1 Mar. 31, 2022

(51) Int. Cl.
*B60W 20/10* (2016.01)
*B60W 40/09* (2012.01)

(52) U.S. Cl.
CPC .......... *B60W 20/10* (2013.01); *B60W 40/09* (2013.01); *B60W 2510/081* (2013.01); *B60W 2510/083* (2013.01); *B60W 2510/105* (2013.01); *B60W 2510/18* (2013.01)

(58) Field of Classification Search
CPC .............. B60W 40/09; B60W 20/10; B60W 2510/081; B60W 2510/18; B60W 2510/105; B60W 2510/083
See application file for complete search history.

(56) References Cited

U.S. PATENT DOCUMENTS

| | | | |
|---|---|---|---|
| 6,018,694 A * | 1/2000 | Egami | B60W 10/26 903/952 |
| 7,082,358 B2 * | 7/2006 | Sugo | B60K 23/0808 180/197 |
| 8,886,421 B2 * | 11/2014 | Lee | B60K 28/10 701/54 |
| 9,086,026 B2 * | 7/2015 | Levijoki | F02D 41/1497 |
| 9,415,771 B1 * | 8/2016 | Shigemoto | B60L 15/2054 |
| 9,651,015 B2 * | 5/2017 | Jung | B60T 7/122 |
| 10,065,647 B2 * | 9/2018 | Tiwari | G05D 1/0217 |
| 10,632,996 B2 * | 4/2020 | Lechlitner | B60W 20/19 |
| 11,161,510 B2 * | 11/2021 | Doering | B60W 20/19 |
| 11,187,168 B2 * | 11/2021 | Puntambekar | F02D 37/02 |
| 2020/0156613 A1 * | 5/2020 | Cecil | B60W 30/18136 |

* cited by examiner

*Primary Examiner* — Khoi H Tran
*Assistant Examiner* — Rodney P King

(57) ABSTRACT

A system of a vehicle includes: a torque request module configured to determine a first engine torque request based on a driver input and to set a second engine torque request to a lesser one of (a) the first engine torque request and (b) an engine torque limit; and a torque limit module configured to, when a vehicle speed is less than a predetermined speed, an accelerator pedal position is greater than a predetermined accelerator pedal position, and a brake torque request for braking of the vehicle is greater than a predetermined torque, set the engine torque limit to less than the first engine torque request.

20 Claims, 5 Drawing Sheets

SYSTEMS AND METHODS FOR LIMITING ENGINE TORQUE AND CONTROLLING A CLUTCH

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to powertrains of vehicles and more particularly to systems and methods for controlling an engine and a transmission of a vehicle.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

SUMMARY

In a feature, a system of a vehicle includes: a torque request module configured to determine a first engine torque request based on a driver input and to set a second engine torque request to a lesser one of (a) the first engine torque request and (b) an engine torque limit; and a torque limit module configured to, when a vehicle speed is less than a predetermined speed, an accelerator pedal position is greater than a predetermined accelerator pedal position, and a brake torque request for braking of the vehicle is greater than a predetermined torque, set the engine torque limit to less than the first engine torque request.

In further features, the torque limit module is configured to set the engine torque limit to a predetermined torque that is greater than a maximum possible value of the first engine torque request when at least one of: (a) the accelerator pedal position is less than the predetermined accelerator pedal position, (b) the brake torque request is less than the predetermined torque, and (c) the vehicle speed is greater than the predetermined speed.

In further features, an enabling/disabling module is configured to disable the torque limit module when a present gear of a transmission is not included in a predetermined subset of gears of the transmission, where the predetermined subset of gears includes less than all gears of the transmission.

In further features, the predetermined subset of gears include only a first gear, a second gear, and a reverse gear.

In further features, an enabling/disabling module is configured to disable the torque limit module when the accelerator pedal position is less than or equal to a second predetermined accelerator pedal position that is less than the predetermined accelerator pedal position.

In further features, an enabling/disabling module is configured to disable the torque limit module when a brake pedal position is less than or equal to a predetermined brake pedal position.

In further features, a control module is configured to actuate an engine actuator based on the second engine torque request.

In further features, the limiting module is configured to set the engine torque limit based on the brake torque request.

9 In further features, the limiting module is configured to decrease the engine torque limit as the brake torque request increases and to increase the engine torque limit as the brake torque request decreases.

In further features, the limiting module is configured to set the engine torque limit further based on a present gear of a transmission.

In further features, a clutch control module is configured to, when the accelerator pedal position is greater than the predetermined accelerator pedal position, the brake torque request for braking of the vehicle is greater than a second predetermined torque, and a wheel slip is greater than a predetermined slip, open a clutch that closed and transferring torque from an engine to a transmission.

In further features, a wheel slip module is configured to set the wheel slip based on an average of speeds of driven wheels of the vehicle divided by an average of speeds of undriven wheels of the vehicle.

13. In further features, the second predetermined torque is greater than the predetermined torque.

In further features, a clutch control module is configured to, when the accelerator pedal position is greater than the predetermined accelerator pedal position, the brake torque request for braking of the vehicle is greater than a second predetermined torque, an increase in the brake torque request is greater than a predetermined torque increase, and a wheel slip is greater than a predetermined slip, open a clutch that closed and transferring torque from an engine to a transmission.

In further features, a wheel slip module is configured to set the wheel slip based on an average of speeds of driven wheels of the vehicle divided by an average of speeds of undriven wheels of the vehicle.

In further features, the second predetermined torque is greater than the predetermined torque.

In further features, the transmission is a dual clutch transmission (DCT).

In further features, an electronic brake control module is configured to apply pressure to brake calipers of the vehicle based on the brake torque request.

In further features, the electronic brake control module is configured to determine the brake torque request based on a brake pedal position.

In a feature, a method for a vehicle includes: determining a first engine torque request based on a driver input; setting a second engine torque request to a lesser one of (a) the first engine torque request and (b) an engine torque limit; and when a vehicle speed is less than a predetermined speed, an accelerator pedal position is greater than a predetermined accelerator pedal position, and a brake torque request for braking of the vehicle is greater than a predetermined torque, setting the engine torque limit to less than the first engine torque request.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine control module controls torque output of an engine based on a torque request. A transmission control module controls actuation of one or more clutches of a transmission, such as for gear shifts and to engage different gear sets within the transmission.

Under some circumstances, a driver of a vehicle may simultaneously request both a high level of engine torque output and a high level of braking torque by friction brakes of the vehicle. This may be requested, for example, to perform a burnout. One or more driveline components, such as half shafts, may be damaged under such conditions.

The present application involves limiting engine torque output when an accelerator pedal position is greater than a predetermined accelerator pedal position, a brake torque request for braking is greater than a first predetermined torque, and a vehicle speed is less than a predetermined speed. An active (closed) clutch may be opened when the accelerator pedal position is greater than the predetermined accelerator pedal position and the brake pedal becomes greater than a second predetermined torque that is greater than the first predetermined torque. Limiting the torque output of the engine and/or opening the clutch may decrease a risk of damage to the driveline components. Limiting the torque output of the engine and/or opening the active clutch may also allow for one or more lighter and/or less costly driveline components to be used.

Figure 1:
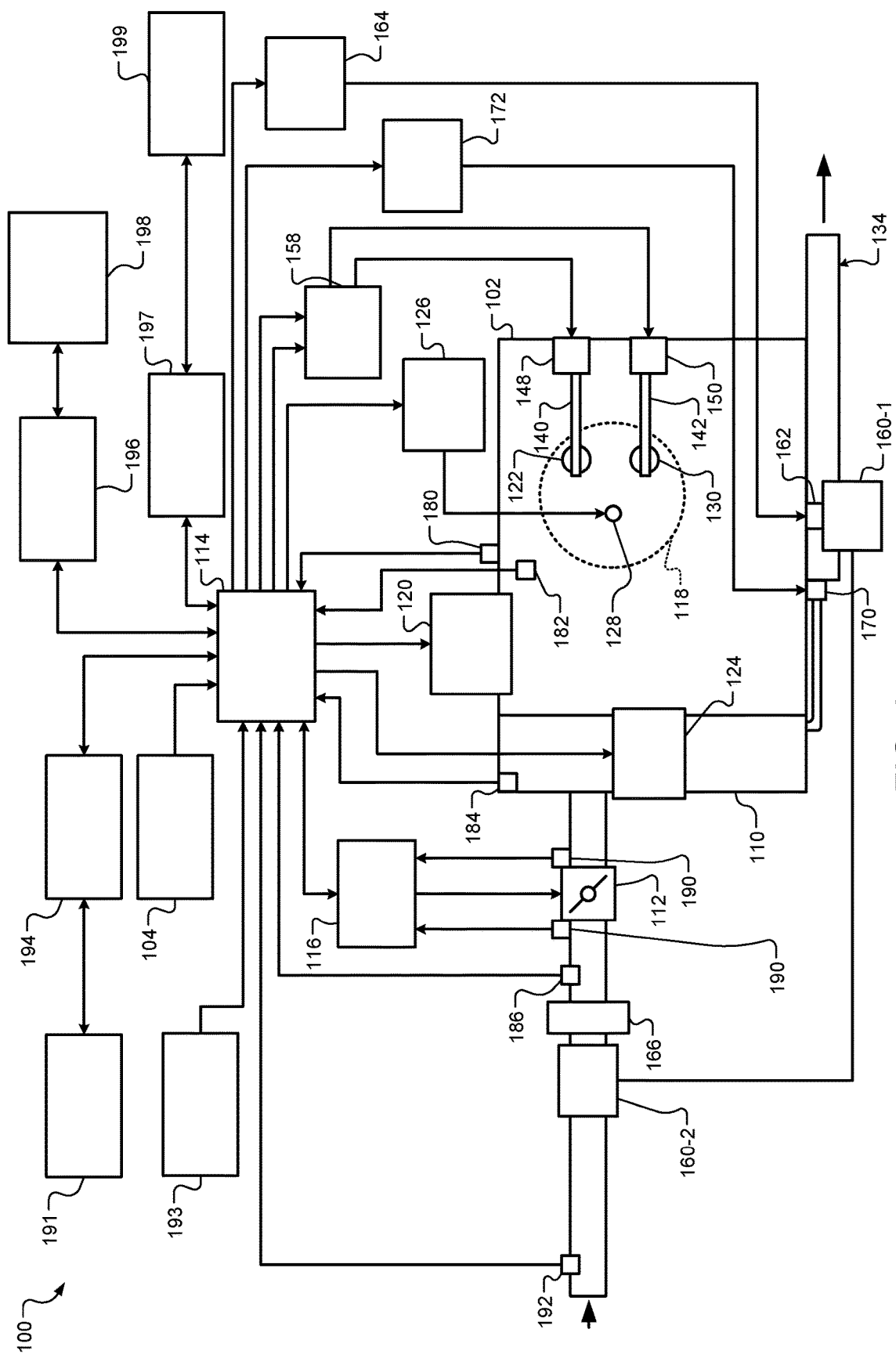
FIG. 1 is a functional block diagram of an example engine system.

Referring now to FIG. 1, a functional block diagram of an example engine system 100 is presented. The engine system 100 includes an engine 102 that combusts an air/fuel mixture to produce drive torque for a vehicle based on driver input from a driver input module 104. The engine 102 may be a gasoline spark ignition internal combustion engine.

Air is drawn into an intake manifold 110 through a throttle valve 112. For example only, first throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions may be necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. A spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. Generating spark may be referred to as a firing event. The spark actuator module 126 may have the ability to vary the timing of the spark for each firing event. The spark actuator module 126 may vary the spark timing for a next firing event when the spark timing is changed between a last firing event and the next firing event. The spark actuator module 126 may halt provision of spark to deactivated cylinders.

During the combustion stroke, the combustion of the air/fuel mixture drives the piston away from TDC, thereby driving the crankshaft. The combustion stroke may be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). In various other implementations, the intake valve 122 and/or the exhaust valve 130 may be controlled by devices other than camshafts, such as camless valve actuators. The cylinder actuator module 120 may deactivate the cylinder 118 by disabling opening of the intake valve 122 and/or the exhaust valve 130.

The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a turbocharger that includes a hot turbine 160-1 that is powered (rotatably driven) by hot exhaust gases flowing through the exhaust system 134. The turbocharger also includes a cold air compressor 160-2 that is driven by the turbine 160-1. The compressor 160-2 compresses air leading into the throttle valve 112.

A wastegate 162 may allow exhaust to bypass the turbine 160-1, thereby reducing the boost (the amount of intake air compression) provided by the turbocharger. A boost actuator module 164 may control the boost of the turbocharger by controlling opening of the wastegate 162. Boost may decrease as opening of the wastegate 162 increases and vice versa. In various implementations, two or more turbochargers may be implemented and may be controlled by the boost actuator module 164.

A charge air cooler (CAC) 166 may transfer heat from the compressed air charge to a cooling medium, such as engine coolant or air. The compressed air charge may receive heat, for example, via compression and/or from components of the exhaust system 134. Although shown separated for purposes of illustration, the turbine 160-1 and the compressor 160-2 may be attached to each other, placing intake air in close proximity to hot exhaust.

The engine system 100 may include one or more EGR valves, such as an EGR valve 170, which selectively redirect exhaust gas back to the intake manifold 110. The EGR valve 170 may be located upstream of the turbocharger's turbine 160-1. An additional (low pressure) EGR valve may be located downstream of the turbine 160-1. The EGR valve(s) may be controlled by an EGR actuator module 172 based on signals from the ECM 114.

A position of the crankshaft may be measured using a crankshaft position sensor 180. A rotational speed of the crankshaft (an engine speed) may be determined based on the crankshaft position. A temperature of the engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. An ambient temperature of air being drawn into the engine 102 may be measured using an intake air temperature (IAT) sensor 192. The engine system 100 may also include one or more other sensors 193, such as an accelerator pedal position (APP) sensor, a brake pedal position (BPP) sensor, an ambient humidity sensor, one or more knock sensors, a compressor outlet pressure sensor and/or a throttle inlet pressure sensor, a wastegate position sensor, an EGR position sensor, and/or one or more other suitable sensors. The ECM 114 may use signals from the sensors to make control decisions for the engine system 100.

The ECM 114 may communicate with a transmission control module 194, such as to coordinate engine torque output with shifting gears in a transmission 191 and actuation of one or more clutches. The transmission 191 may be, for example, a dual clutch transmission (DCT) that includes two input shafts associated with two gear sets (e.g., an even gear set and an odd gear set). A first clutch may be actuated (e.g., engaged) to transfer torque from the engine 102 to one of the input shafts, and a second clutch may be actuated (e.g., engaged) to transfer torque from the engine 102 to the other one of the input shafts. While the example of a DCT is provided, the transmission 191 may be another type of transmission. The transmission 191 transfers torque to wheels via a driveline including a plurality of shafts, such as one or more drive shafts, half shafts, etc.

The ECM 114 may communicate with a hybrid control module 196, such as to coordinate operation of the engine 102 and an electric motor 198. The electric motor 198 may also function as a generator and may be used to produce electrical energy for use by vehicle electrical systems and/or for storage in a battery.

An electronic brake control module (EBCM) 197 controls application of friction brakes 199 based on a BPP measured by the BPP sensor. For example, the EBCM 197 may control a pressure of brake fluid applied to brake calipers based on the BPP. The EBCM 197 may, for example, increase the pressure as the BPP increases away from a resting (e.g., 0) position and vice versa.

In various implementations, various functions of the ECM 114, the transmission control module 194, the EBCM 197, and the hybrid control module 196 may be integrated into one or more modules. While the example of the hybrid control module 196, the EBCM 197, and the transmission control module 194 communicating with the ECM 114 is provided, the control modules discussed herein may communicate with one another via a communication bus.

Each engine system that varies an engine parameter may be referred to as an engine actuator. For example, the throttle actuator module 116 may adjust opening of the throttle valve 112 to achieve a target throttle opening area. The spark actuator module 126 controls the spark plugs to achieve a target spark timing relative to piston TDC. The fuel actuator module 124 controls the fuel injectors to achieve target fueling parameters. The phaser actuator module 158 may control the intake and exhaust cam phasers 148 and 150 to achieve target intake and exhaust cam phaser angles, respectively. The EGR actuator module 172 may control the EGR valve(s) to achieve one or more target EGR opening areas. The boost actuator module 164 controls the wastegate 162 to achieve a target wastegate opening area. The cylinder actuator module 120 controls cylinder deactivation to achieve a target number of activated or deactivated cylinders. The ECM 114 generates the target values for the engine actuators to cause the engine 102 to generate a target engine output torque (a torque request).

Figure 2:
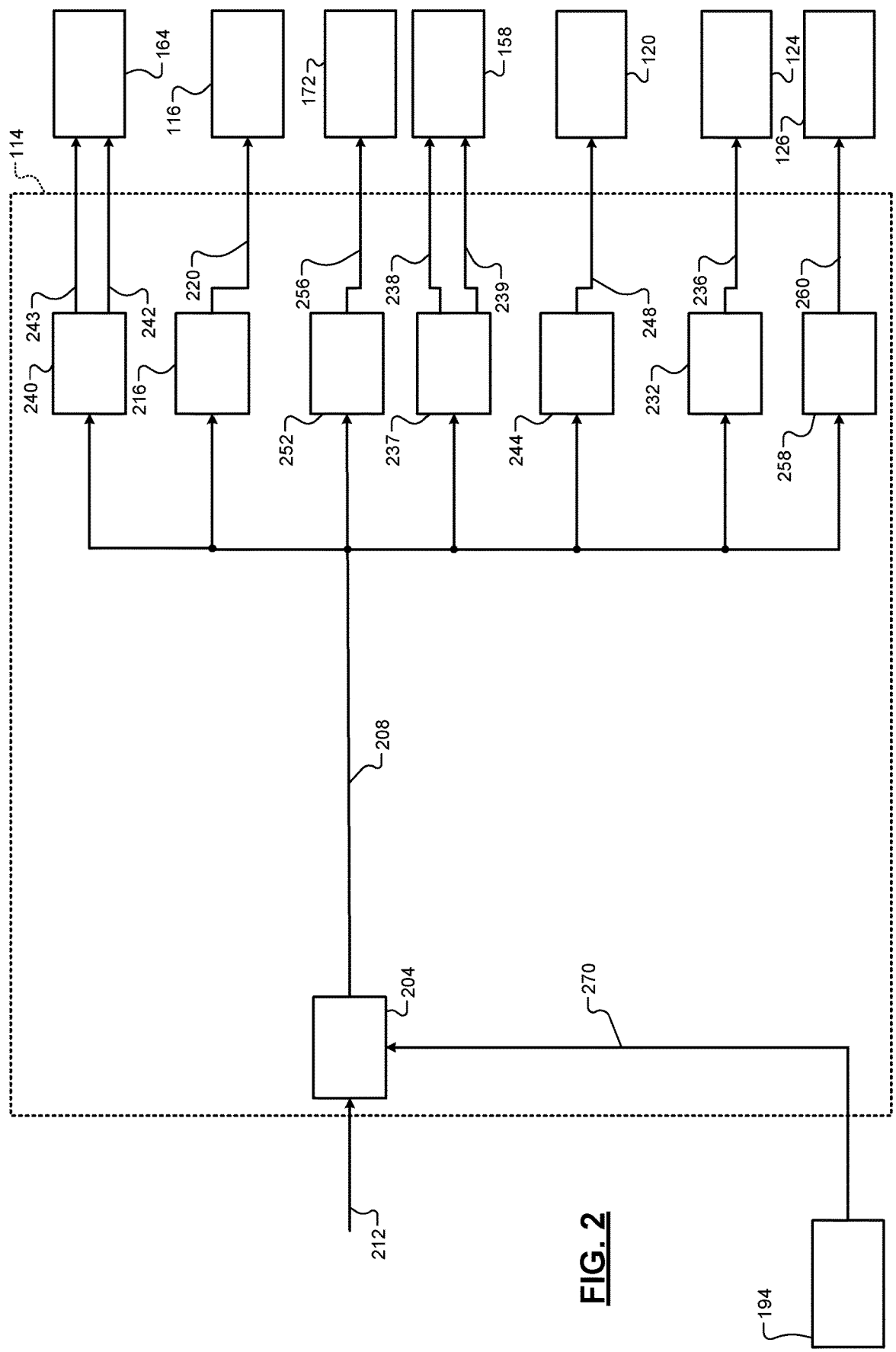
FIG. 2 is a functional block diagram of an example engine control module.

Referring now to FIG. 2, a functional block diagram of an example engine control system is presented. A torque request module 204 determines a torque request 208 for the engine 102 based on one or more inputs 212. The inputs 212 may include, for example, the accelerator pedal position (APP), the BPP, a cruise control input, and/or one or more other suitable inputs. For example, the torque request module 204 may increase the torque request 208 as the APP increases (relative to a predetermined resting (0) APP) and vice versa. The torque request module 204 may determine the torque request 208 additionally or alternatively based on one or more other torque requests, such as torque requests generated by the ECM 114 and/or torque requests received from other modules of the vehicle, such as the transmission control module 194, the EBCM 197, the hybrid control module 196, etc. The torque request module 204 may determine the torque request 208 (e.g., in Nm) using one or more equations and/or lookup tables that relate input(s) to torque requests.

The torque request module 204 may also determine the amount of torque to be produced by the engine 102 and the amount of torque to be produced via one or more electric motors. The torque request module 204 may transmit a motor torque request to the hybrid control module 196 corresponding to the amount of torque to be produced via the one or more electric motors. The hybrid control module 196 controls an inverter that controls electric power flow to and from the electric motor(s) to achieve the motor torque request.

The ECM 114 controls the engine actuators based on the torque request 208 and/or one or more other parameters. For example, a throttle control module 216 may determine a target throttle opening 220 based on the torque request 208. The throttle actuator module 116 may adjust opening of the throttle valve based on the target throttle opening 220, respectively.

A fuel control module 232 determines one or more target fueling parameters 236 based on the torque request 208. For example, the target fueling parameters 236 may include a target equivalence ratio (EQR) or mass of fuel, number of fuel injections per combustion event, and timing for each of the injections. The fuel actuator module 124 injects fuel based on the target fueling parameters 236.

A phaser control module 237 determines target intake and exhaust cam phaser angles 238 and 239 based on the torque request 208. The phaser actuator module 158 may regulate the intake and exhaust cam phasers 148 and 150 based on the target intake and exhaust cam phaser angles 238 and 239, respectively.

A boost control module 240 sets a target wastegate opening 242 based on the torque request 208. The boost actuator module 164 controls opening of the wastegate 162 based on the target wastegate opening 242. For example only, the boost actuator module 164 may determine a target duty cycle (DC) to apply to the wastegate 162 based on the target wastegate opening 242 using an equation or a lookup table that relates target wastegate openings to target DCs. The boost actuator module 164 may apply a signal to the wastegate 162 based on the target DC.

The boost control module 240 may also set a target turbo configuration 243 based on the torque request 208. The target turbo configuration 243 may include, for example, a position of vanes of the turbocharger, a geometry of the turbocharger, or another suitable parameter. The boost actuator module 164 may control the turbocharger turbine and/or the turbocharger compressor based on the target turbo configuration 243.

A cylinder control module 244 may generate cylinder activation/deactivation commands 248 based on the torque request 208. The cylinder actuator module 120 deactivates the intake and exhaust valves of the cylinders based on the activation/deactivation commands 248.

The fuel control module 232 halts fueling of deactivated cylinders. The fuel control module 232 sets the target fueling parameters 236 to provide fuel to activated cylinders. Cylinder deactivation is different than fuel cutoff (e.g., deceleration fuel cutoff). When a cylinder is deactivated, the cylinder's intake and exhaust valves are maintained closed. When fuel is cutoff to a cylinder, the cylinder's intake and exhaust valves may still be opened and closed. The fuel control module 232 may cutoff fuel to one, more than one, or all of the cylinders of the engine, for example, during vehicle deceleration. This may decrease fuel consumption of the engine 102.

An EGR control module 252 determines a target EGR opening 256 based on the torque request 208. The EGR actuator module 172 controls opening of the EGR valve 170 based on the target EGR opening. The EGR control module 252 may also determine another target EGR opening (e.g., for a low pressure EGR valve). The EGR actuator module 172 (or another EGR actuator module) may control opening of another EGR valve based on the other target EGR opening.

A spark control module 258 determines a target spark timing 260 based on the torque request 208. The spark actuator module 126 controls spark timing based on the target spark timing 260. The target actuator values may be determined using equations or lookup tables that relate torque requests to target actuator values.

Under some circumstances, the torque request module 204 (upper) limits the torque request 208. For example, the transmission control module 194 may generate a torque limit 270 under some circumstances, such as when a driver is applying pressure to the accelerator pedal and a brake pedal simultaneously, for example, to attempt to perform a burnout. If the torque request 208 (determined based on the driver input 212) is less than or equal to the torque limit 270, the torque request module 204 leaves the torque request 208 unchanged and sets the torque request 208 based on the driver input 212. If the torque request 208 (determined based on the driver input 212) is greater than the torque limit 270, the torque request module 204 sets the torque request 208 to the torque limit 270. This limits engine torque output to, at a maximum, the torque limit 270.

For example, the torque request module 204 may determine a first torque request based on the driver input 212, as discussed above. The torque request module 204 may set the torque request 208 to a lesser one of the first torque request and the torque limit 270.

Figure 3:
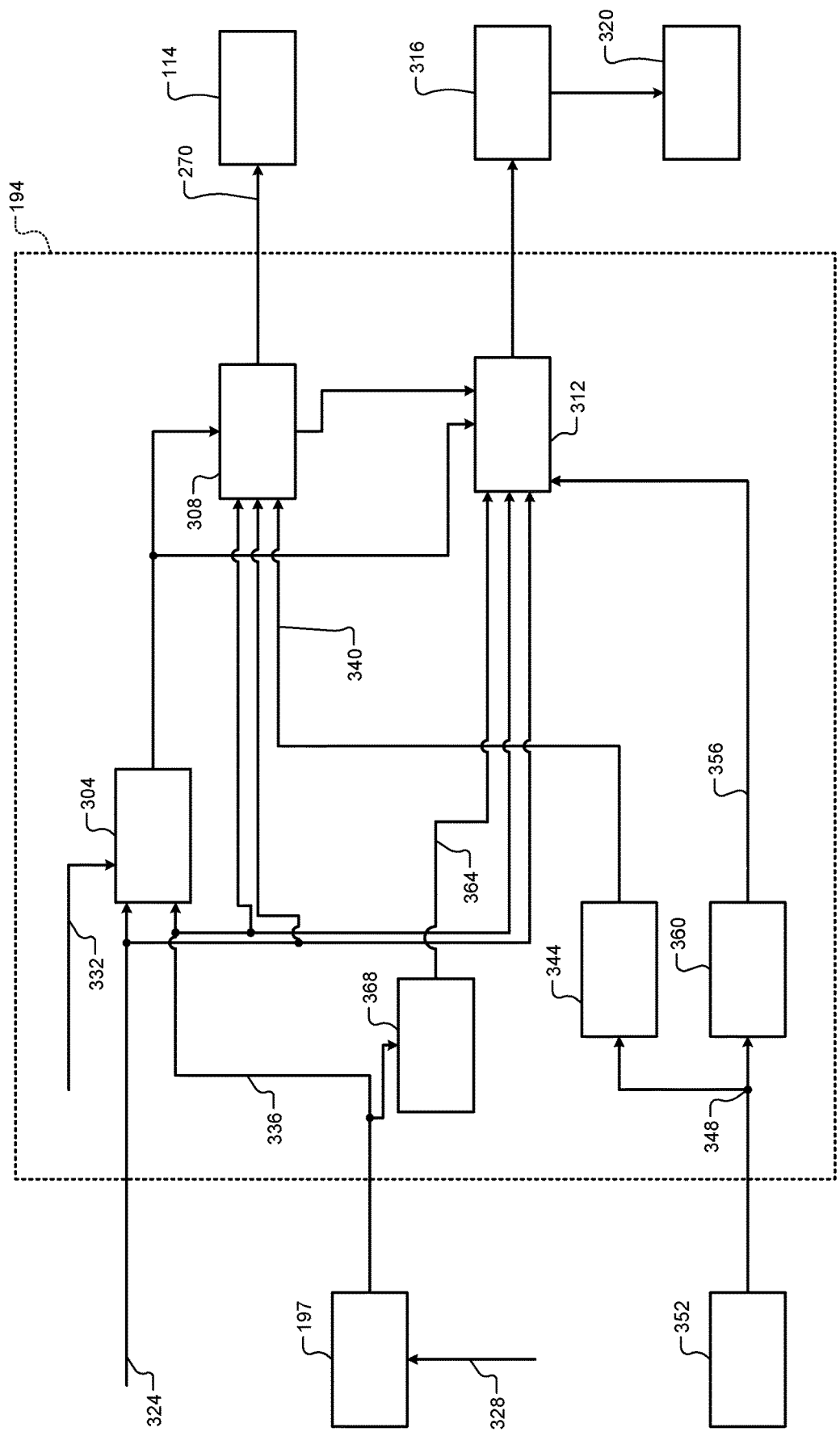
FIG. 3 is a functional block diagram of an example transmission control module.

FIG. 3 is a functional block diagram of an example implementation of the transmission control module 194. An enabling/disabling module 304 selectively enables and disables a limiting module 308 and a clutch control module 312. The limiting module 308 sets the torque limit 270 as discussed further below. The clutch control module 312 actuates clutch actuators 316 that actuate the clutch(es) 320 of the transmission 191 as discussed further below.

The enabling/disabling module 304 determines whether to enable or disable the limiting module 308 and the clutch control module 312 based on the APP 324, the BPP 328, and a present gear (or gear ratio) 332 of the transmission 191. For example, the enabling/disabling module 304 may enable the limiting module 308 and the clutch control module 312 when the APP 324 is greater than a first predetermined APP, the BPP 328 is greater than a first predetermined BPP, and the gear 332 is in a predetermined subset of the gears of the transmission 191 (e.g., reverse, first gear, or second gear).

The enabling/disabling module 304 may disable the limiting module 308 and the clutch control module 312 otherwise. In other words, the enabling/disabling module 304 may disable the limiting module 308 and the clutch control module 312 when at least one of: (a) the APP 324 is less than or equal to the first predetermined APP, (b) the BPP 328 is less than or equal to the first predetermined BPP, and (c) the gear 332 is not within the predetermined subset of the gears (i.e., not in one of reverse, first, or second gear).

The APP 324 and the BPP 328 may be expressed as values between 0 and 100. The APP 324 may be set to 0 by the APP sensor when no pressure is being applied to the accelerator pedal (i.e., the accelerator pedal is in the predetermined resting APP). The BPP 328 may be set to 0 by the BPP sensor when no pressure is being applied to the brake pedal (i.e., the brake pedal is in the predetermined resting BPP). In various implementations, the first APP and the first BPP may be 0 or 5 or less than 5.

The EBCM 197 may determine a brake torque (request) 336 based on the BPP 328. The EBCM 197 may determine the brake torque 336, for example, using an equation or a lookup table that relates BPPs to brake torques. The EBCM 197 may increase the brake torque 336 as the BPP increases and vice versa. The EBCM 197 may determine a target pressure to apply to the brakes 199 based on the brake torque 336. The EBCM 197 may determine the target pressure, for example, using an equation or a lookup table that relates brake torques to target pressures. The EBCM 197 may, for example, increase the target pressure as the brake torque increases and vice versa. The EBCM 197 may actuate one or more actuators to apply pressure to the brakes 199 (e.g., the calipers) at the target pressure.

When the limiting module 308 is disabled, the limiting module 308 may set the torque limit 270 to a predetermined maximum torque such that the torque request 208 will not be limited by the limiting module 308. The predetermined maximum torque may be, for example, 500-1000 Newton meters (Nm) or another suitable torque that is greater than a maximum possible torque output of the engine 102.

When the limiting module 308 is enabled, the limiting module 308 may set the torque limit 270 to less than the torque request 208 (determined based on the driver input 212) when torque limiting conditions are present. For example, the limiting module 308 may set the torque limit to less than the torque request 208 when a vehicle speed 340 is less than a predetermined speed, the APP 324 is greater than a second predetermined APP, and the brake torque 336 is greater than a first predetermined brake torque. The predetermined speed, the second predetermined APP, and the first predetermined brake torque may be calibrated. For example only, the predetermined speed may be approximately 100 kilometers per hour (kph), the second predetermined APP may be approximately 10-30 (percent), and the first predetermined brake torque may be approximately 1000-1500 Nm. Other suitable values greater than zero may be used. The second predetermined APP is greater than the first predetermined APP.

A vehicle speed module 344 determines the (present) vehicle speed 340 based on one or more wheel speeds 348 measured by one or more wheel speed sensors 352. For example, one wheel speed sensor may be provided per wheel to measure the rotational speed of that wheel (wheel speed). In various implementations, the vehicle speed module 344 may set the vehicle speed 340 based on or equal to an average of the wheel speeds of undriven wheels of the vehicle. The average may be equal to a sum of the wheel speeds divided by the number of wheel speeds summed. Undriven wheels may not receive torque output by the transmission 191 while driven wheels receive torque output by the transmission 191.

The limiting module 308 may determine the torque limit 270 based on the brake torque 336. The limiting module 308 may determine the torque limit 270, for example, using an equation or a lookup table that relates brake torques to torque limits. For example, the limiting module 308 may decrease the torque limit 270 (thereby increasingly limiting engine torque output) as the brake torque 336 increases and vice versa. Alternatively, the limiting module 308 may determine the torque limit 270 based on the BPP 328 or the target pressure. The limiting module 308 may decrease the torque limit as the BPP 328 or the target pressure increases, and vice versa.

When the clutch control module 312 is disabled, the clutch control module 312 may control the clutch actuators 316 and the clutches 320 using normal control. When the clutch control module 312 is enabled, the clutch control module 312 may open (e.g., disengage) an active (closed/engaged) clutch of the transmission 191 when first clutch opening conditions are present. For example, the clutch control module 312 may open the active clutch of the transmission 191 when the APP 324 is greater than the second predetermined APP, the brake torque 336 is greater than a second predetermined brake torque, and a wheel slip 356 is greater than a predetermined slip. In various implementations, a third predetermined APP that is greater than the second predetermined APP may be used. The second predetermined brake torque and the predetermined wheel slip may be calibrated. For example only, the predetermined wheel slip may be approximately 5-10 percent and the second predetermined brake torque may be approximately 3000-6000 Nm. Other suitable values greater than zero may be used. The second predetermined brake torque is greater than the first predetermined brake torque.

A slip module 360 determines the wheel slip 356 based on one or more driven (e.g., rear) wheel speeds and one or more undriven (e.g., front) wheel speeds. For example, the slip module 360 may set the wheel slip 356 based on or equal to an average of the driven wheels divided by an average of the undriven wheels.

Additionally or alternatively, when the clutch control module 312 is enabled, the clutch control module 312 may open (e.g., disengage) an active (closed/engaged) clutch of the transmission 191 when second clutch opening conditions are present. For example, the clutch control module 312 may open the active clutch of the transmission 191 when the APP 324 is greater than the second (or third) predetermined APP, the brake torque 336 is greater than a third predetermined brake torque, the wheel slip 356 is greater than the predetermined slip, and an increase 364 in the brake torque 336 is greater than a predetermined torque increase. The third predetermined brake torque and the predetermined torque increase may be calibrated. For example only, the predetermined torque increase may be approximately 2000-4000 Nm per second, and the third predetermined brake torque may be approximately 2000-4000 Nm. Other suitable values greater than zero may be used. The third predetermined brake torque is greater than the first predetermined brake torque and less than the second predetermined brake torque.

An increase module 368 sets the increase 364 based on a second value of the brake torque 336 at a second time minus a first value of the brake torque 336 at a first time that is before the second time. As such, the increase 364 will be positive if the brake torque 336 at the second time is greater than the brake torque 336 at the first time (i.e., increased relative to the first time).

Figure 4:
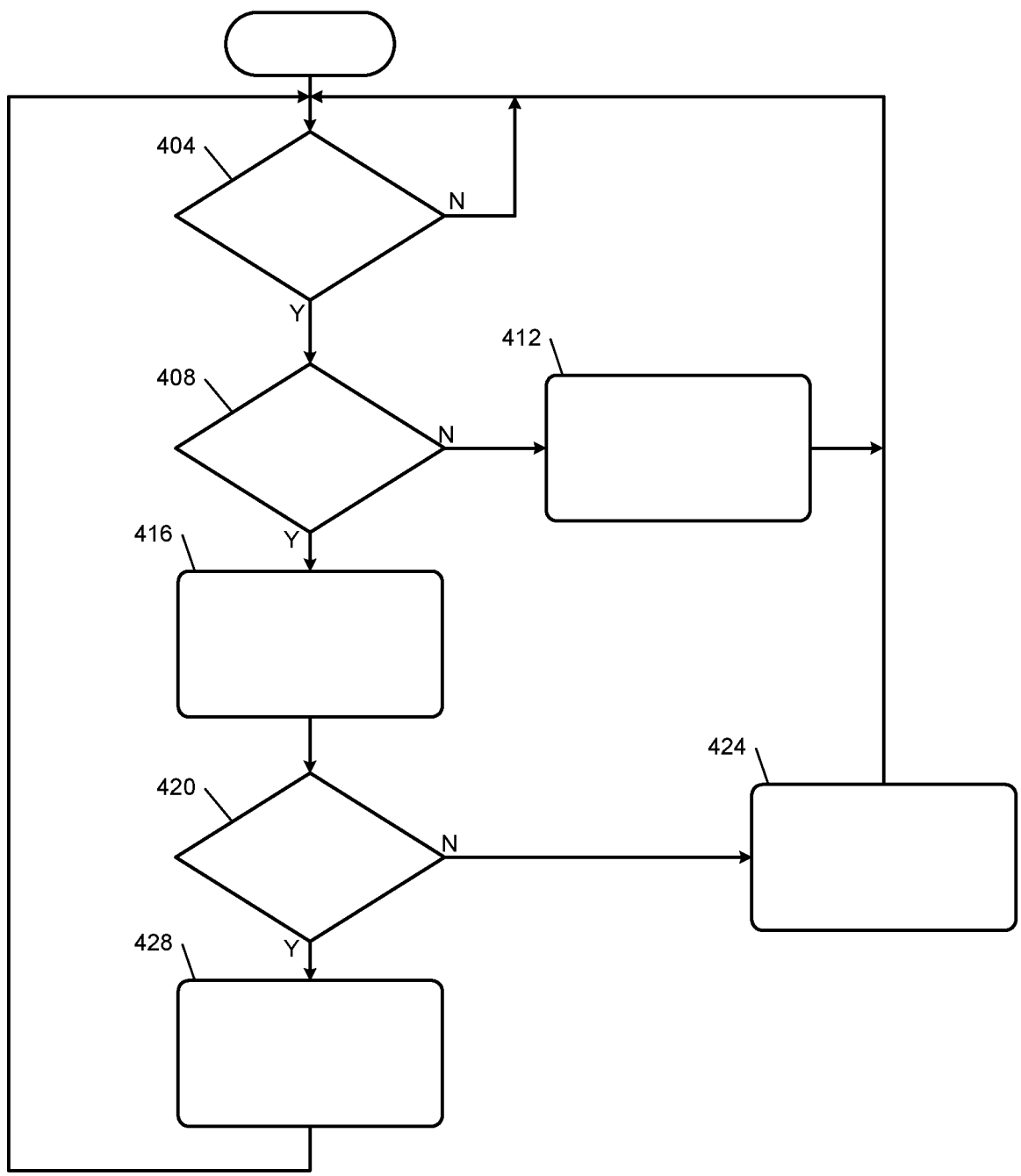
FIG. 4 is a flowchart depicting an example method of engine torque limiting and clutch opening.

FIG. 4 is a flowchart depicting an example method of engine torque limiting and clutch opening. Control begins with 404 where the enabling/disabling module 304 determines whether enabling conditions are satisfied. For example, the enabling/disabling module 304 may determine whether the APP 324 is greater than the first predetermined APP, the BPP 328 is greater than the first predetermined BPP, and the gear 332 is in the predetermined subset of the gears of the transmission 191 (e.g., reverse, first gear, or second gear). If 404 is true, the enabling/disabling module 304 enables the limiting module 308 and the clutch control module 312, and control continues with 408. If 404 is false, the enabling/disabling module 304 disables the limiting module 308 and the clutch control module 312, and control returns to 404. The limiting module 308 sets the torque limit 270 to the predetermined maximum torque when disabled, and the clutch control module 312 performs normal control of the clutches when disabled.

At 408, the limiting module 308 determines whether the torque limiting conditions are satisfied. For example, the limiting module 308 may determine whether the vehicle speed 340 is less than the predetermined speed, the APP 324 is greater than the second predetermined APP, and the brake torque 336 is greater than the first predetermined brake torque. If 408 is false, the limiting module 308 sets the torque limit 270 to the predetermined maximum torque at 412 (thereby not limiting engine torque output), and control returns to 404. If 408 is true, control continues with 416.

At 416, the limiting module 308 determines the engine torque limit 270 based on the brake torque 336. The torque request module 204 sets the torque request 208 to the torque limit 270 when the torque limit 270 is less than the torque request 208 and controls the engine actuators based on the torque request 208.

At 420, the clutch control module 312 determines whether the first clutch opening conditions and/or the second clutch opening conditions are satisfied. For example, the clutch control module 312 may determine whether (a) the APP 324 is greater than the second predetermined APP, (b) the brake torque 336 is greater than the second predetermined brake torque, and (c) the wheel slip 356 is greater than the predetermined slip. Additionally or alternatively, the clutch control module 312 may determine whether (i) the APP 324 is greater than the second (or third) predetermined APP, (ii) the brake torque 336 is greater than the third predetermined brake torque, (iii) the wheel slip 356 is greater than the predetermined slip, and (iv) an increase 364 in the brake torque 336 is greater than the predetermined torque increase. If (a), (b), and (c) are satisfied and/or (i), (ii), (iii), and (iv) are satisfied, 420 is true, and the clutch control module 312 opens (disengages) the active clutch at 428, and control returns to 404. If at least one of (a), (b), and (c) is not satisfied and/or at least one of (i), (ii), (iii), and (iv) is not satisfied, 420 is false, and the clutch control module 312 continues normal control of the active clutch at 424 (which may include maintaining the active clutch closed), and control returns to 404. Limiting the torque output of the engine 102 and/or opening the active clutch may protect driveline components (e.g., half shafts).

Figure 5:
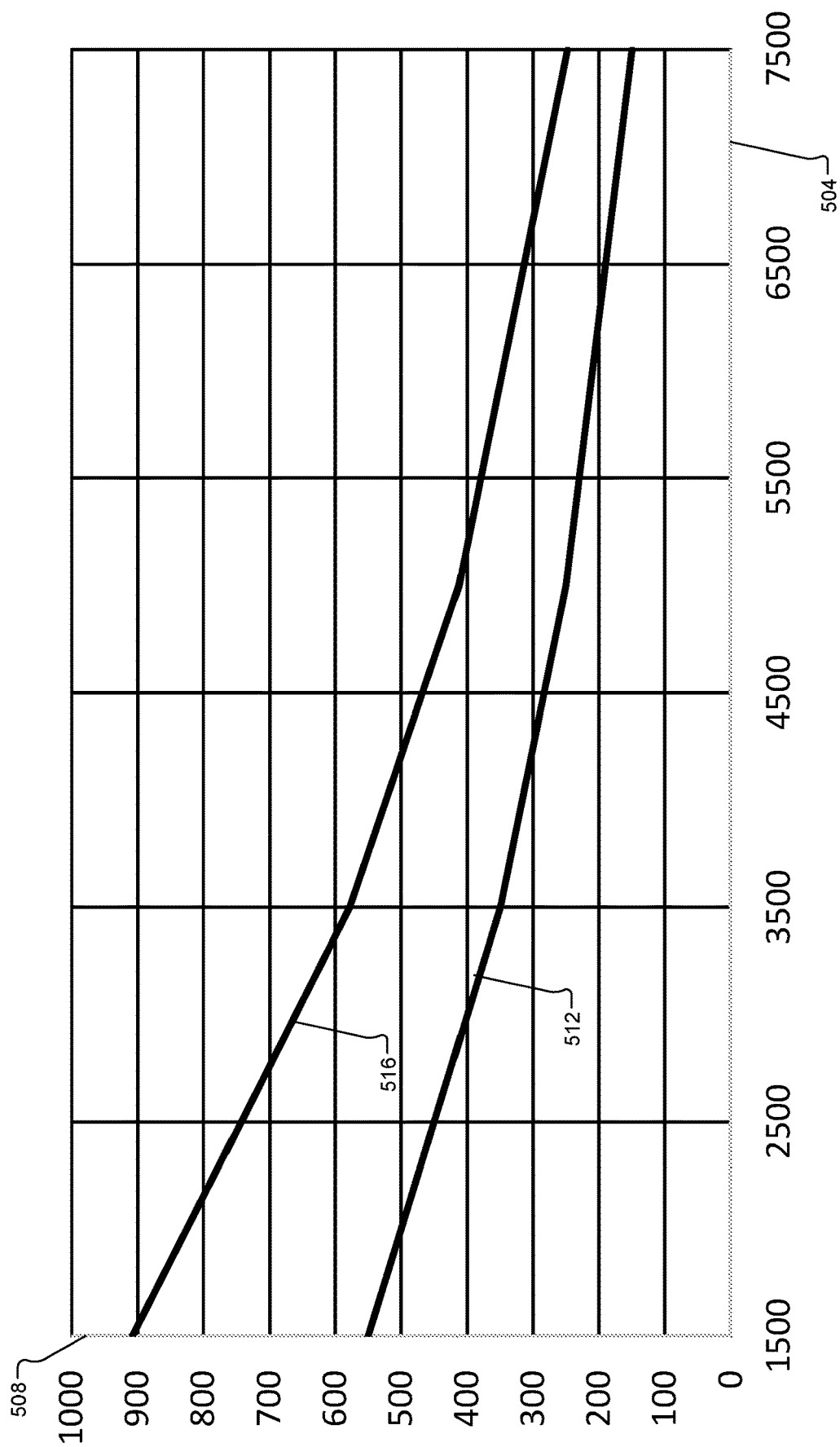
FIG. 5 is an example graph of engine torque limits versus brake torques.

FIG. 5 is an example graph of torque limit 508 (the torque limit 270) versus brake torques 504 for two different gears 512 (first gear) and 516 (second gear). The clutch control module 312 may determine the torque limit 270 further based on the gear 332.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system of a vehicle, comprising:
a torque request module configured to determine a first engine torque request based on a driver input and to set a second engine torque request to a lesser one of (a) the first engine torque request and (b) an engine torque limit; and
a torque limit module configured to, when a vehicle speed is less than a predetermined speed, an accelerator pedal position is greater than a predetermined accelerator pedal position, and a brake torque request for braking of the vehicle is greater than a predetermined torque, set the engine torque limit to less than the first engine torque request,
wherein the torque limit module is configured to set the engine torque limit to a predetermined torque that is greater than a maximum possible value of the first engine torque request when at least one of: (a) the accelerator pedal position is less than the predetermined accelerator pedal position, (b) the brake torque request is less than the predetermined torque, and (c) the vehicle speed is greater than the predetermined speed.

2. The system of claim 1 further comprising an enabling/disabling module configured to disable the torque limit module when a present gear of a transmission is not included in a predetermined subset of gears of the transmission,
wherein the predetermined subset of gears includes less than all gears of the transmission.

3. The system of claim 2 wherein the predetermined subset of gears include only a first gear, a second gear, and a reverse gear.

4. The system of claim 1 further comprising an enabling/disabling module configured to disable the torque limit module when the accelerator pedal position is less than or equal to a second predetermined accelerator pedal position that is less than the predetermined accelerator pedal position.

5. The system of claim 1 further comprising an enabling/disabling module configured to disable the torque limit module when a brake pedal position is less than or equal to a predetermined brake pedal position.

6. The system of claim 1 further comprising a control module configured to actuate an engine actuator based on the second engine torque request.

7. The system of claim 1 wherein the torque limit module is configured to set the engine torque limit based on the brake torque request.

8. The system of claim 7 wherein the torque limit module is configured to decrease the engine torque limit as the brake torque request increases and to increase the engine torque limit as the brake torque request decreases.

9. The system of claim 7 wherein the torque limit is configured to set the engine torque limit further based on a present gear of a transmission.

10. The system of claim 1 further comprising a clutch control module configured to, when the accelerator pedal position is greater than the predetermined accelerator pedal position, the brake torque request for braking of the vehicle is greater than a second predetermined torque, and a wheel slip is greater than a predetermined slip, open a clutch that closed and transferring torque from an engine to a transmission.

11. The system of claim 10 further comprising a wheel slip module configured to set the wheel slip based on an average of speeds of driven wheels of the vehicle divided by an average of speeds of undriven wheels of the vehicle.

12. The system of claim 11 wherein the second predetermined torque is greater than the predetermined torque.

13. The system of claim 1 further comprising a clutch control module configured to, when the accelerator pedal position is greater than the predetermined accelerator pedal position, the brake torque request for braking of the vehicle is greater than a second predetermined torque, an increase in the brake torque request is greater than a predetermined torque increase, and a wheel slip is greater than a predetermined slip, open a clutch that closed and transferring torque from an engine to a transmission.

14. The system of claim 13 further comprising a wheel slip module configured to set the wheel slip based on an average of speeds of driven wheels of the vehicle divided by an average of speeds of undriven wheels of the vehicle.

15. The system of claim 13 wherein the second predetermined torque is greater than the predetermined torque.

16. The system of claim 13 wherein the transmission is a dual clutch transmission (DCT).

17. The system of claim 1 further comprising an electronic brake control module configured to apply pressure to brake calipers of the vehicle based on the brake torque request.

18. The system of claim 17 wherein the electronic brake control module is configured to determine the brake torque request based on a brake pedal position.

19. A method for a vehicle, comprising:
determining a first engine torque request based on a driver input;
setting a second engine torque request to a lesser one of (a) the first engine torque request and (b) an engine torque limit; and
when a vehicle speed is less than a predetermined speed, an accelerator pedal position is greater than a predetermined accelerator pedal position, and a brake torque request for braking of the vehicle is greater than a predetermined torque, setting the engine torque limit to less than the first engine torque request, and
setting the engine torque limit to a predetermined torque that is greater than a maximum possible value of the first engine torque request when at least one of: (a) the accelerator pedal position is less than the predetermined accelerator pedal position, b) the brake torque request is less than the predetermined torque, and (c) the vehicle speed is greater than the predetermined speed.

20. A system of a vehicle, comprising:
a torque request module configured to determine a first engine torque request based on a driver input and to over time set a second engine torque request to a lesser one of (a) the first engine torque request at that time and (b) an engine torque limit at that time; and
a torque limit module configured to, when a vehicle speed is less than a predetermined speed, an accelerator pedal position is greater than a predetermined accelerator pedal position, and a brake torque request for braking of the vehicle is greater than a predetermined torque, set the engine torque limit to less than the first engine torque request.

* * * * *